United States Patent
Segman

(10) Patent No.: US 6,724,435 B2
(45) Date of Patent: Apr. 20, 2004

(54) METHOD FOR INDEPENDENTLY CONTROLLING HUE OR SATURATION OF INDIVIDUAL COLORS IN A REAL TIME DIGITAL VIDEO IMAGE

(75) Inventor: Yosef Segman, Zichron Yaacov (IL)

(73) Assignee: Oplus Technologies Ltd., Yokne'am (IL)

( * ) Notice: Subject to any disclaimer, the term of this patent is extended or adjusted under 35 U.S.C. 154(b) by 444 days.

(21) Appl. No.: 09/922,164

(22) Filed: Aug. 6, 2001

(65) Prior Publication Data

US 2003/0025835 A1 Feb. 6, 2003

(51) Int. Cl.⁷ .............................. H04N 9/64; G09G 5/00; G09G 5/08; G06K 9/00
(52) U.S. Cl. .................. 348/576; 348/673; 382/165; 382/168; 345/157
(58) Field of Search ............................. 348/576–577, 348/649, 650, 651, 687, 673, 679, 703, 582; 386/4, 52, 113, 114; 358/520, 523, 518; 382/165, 168

(56) References Cited

U.S. PATENT DOCUMENTS

| | | | | |
|---|---|---|---|---|
| 3,665,416 A | * | 5/1972 | Hikosaka ...................... 710/57 |
| 5,305,094 A | * | 4/1994 | Belmares-Sarabis et al. ............... 348/651 |
| 5,416,890 A | * | 5/1995 | Beretta ........................ 345/590 |
| 5,504,821 A | * | 4/1996 | Kanamori et al. ........... 382/167 |
| 5,526,020 A | * | 6/1996 | Campanelli et al. ......... 382/165 |
| 5,745,248 A | * | 4/1998 | Nickerson ................... 358/296 |
| 5,798,753 A | * | 8/1998 | Zhou et al. .................. 345/603 |
| 5,801,855 A | * | 9/1998 | Ohta ........................... 358/518 |
| 5,896,136 A | * | 4/1999 | Augustine et al. .......... 345/605 |
| 6,122,012 A | | 9/2000 | Segman |
| 6,317,521 B1 | * | 11/2001 | Gallagher et al. ........... 382/260 |

FOREIGN PATENT DOCUMENTS

| | | | | |
|---|---|---|---|---|
| EP | | 0536894 A2 | * 4/1993 | ............ G06F/3/033 |
| WO | WO 00/52938 | | 9/2000 | |

* cited by examiner

Primary Examiner—Michael H. Lee
Assistant Examiner—Paulos M. Natnael
(74) Attorney, Agent, or Firm—Mark M. Friedman

(57) ABSTRACT

A method for independently controlling hue or saturation of individual colors in a real time digital video image, without affecting the hue or saturation of any other color in the same real time digital video image. Includes selecting a uniquely defined independent color hue control delta value or independent color saturation control delta value, where the delta value represents an extent or magnitude of change in hue or saturation, respectively, of the selected individual color, and, separately evaluating uniquely defined independent color hue control functions or independent color saturation control functions, using input image pixel values of the plurality of input image pixels identified as having the individual color in the real time digital video input image whose hue or saturation was selected to be independently changed, and using the corresponding selected independent color hue control delta value or the corresponding selected independent color saturation control delta value, respectively, for forming and displaying a corresponding plurality of output image pixels having the individual color whose hue or saturation was selected to be independently changed.

32 Claims, No Drawings

METHOD FOR INDEPENDENTLY CONTROLLING HUE OR SATURATION OF INDIVIDUAL COLORS IN A REAL TIME DIGITAL VIDEO IMAGE

FIELD AND BACKGROUND OF THE INVENTION

The present invention relates to color control of real time digital video images and, more particularly, to a method for independently controlling hue or saturation of individual colors in a real time digital video image, without affecting the hue and saturation of any other color in the same real time digital video image.

Controlling colors in a displayed real time digital video image is typically performed by changing the hue, and/or, by increasing or decreasing the saturation of the colors or color components of the real time digital video image. Herein, an 'individual color' represents a linear combination of colors or color components, such as red, green, blue, yellow, cyan, and magenta, where, in RGB color space, the basic colors or color components are red, green, and blue, which are used for defining and evaluating the complementary colors or color components yellow, cyan, and magenta, and, in YCM color space, the basic colors or color components are yellow, cyan, and magenta, which are used for defining and evaluating the complementary colors or color components red, green, and blue. Herein, the term 'hue' refers to the angle between one color or color component and other colors or color components characterized in a particular color space, for example, RGB color space, featuring a color based three-dimensional coordinate system, within a real time digital video input image. Hue is also referred to as tint, or, as a gradation or shade of a color or color component. Herein, the term 'saturation' refers to the intensity of a color or color component characterized in a particular color space, for example, RGB color space, featuring a color based three-dimensional coordinate system, within a real time digital video input image. Saturation is also referred to as vividness of hue.

Different formats are used for characterizing colors or color components in real time digital video images. In one format, real time digital video images feature colors or color components characterized by linear combinations of the basic colors red, green, and blue, in RGB color space. In another format, real time digital video images feature colors or color components characterized by linear combinations of the basic colors yellow, cyan, and magenta, in YCM color space. In still another format, real time digital video images feature colors or color components characterized by linear combinations of the chromatic parts, Cr and Cb, also known in the art as U and V, respectively, in YCrCb or YUV luminance/chromatic color space, respectively. As is well known in the art, one format of a real time digital video image display can be transformed to another format by using appropriate linear combination functions.

In applications involving display of a real time digital video image, a user may desire to adjust or change the hue or saturation of an individual (single) color or color component of the real time digital video image, without affecting the hue or saturation of any other color or color component of the same real time digital video image. For example, a user may desire to adjust the hue or saturation of only one color, such as red, green, blue, yellow, magenta, or, cyan, of a real time digital video image displayed on a television screen, by pushing or turning a color hue or color saturation or intensity control button or dial on a control device associated with the television screen. Unfortunately, however, controlling hue or saturation of an individual color by this procedure affects the hue and/or saturation of all the colors or color components of the television image, and not just the hue or saturation of the individual color desired to be changed by the user.

In PCT International Patent Application Publication No. WO/00052938, published Sep. 08, 2000, taking priority from U.S. patent application Ser. No. 09/261,193, filed Mar. 03, 1999, now U.S. Pat. No. 6,122,012, by the same inventor of the present invention, there is disclosed a "Method Of Selective Color Control Of Digital Video Images". The disclosed method features using simple Look-Up-Tables (LUTs), whose values are calculated from uniquely defined color control functions, to digitally change the saturation or intensity of a single color of the chromatic part of a digital video image without affecting the saturation or intensity of any other color of the chromatic part of the same digital video image. A digital video input image is scanned, row by row, pixel by pixel. Each input image pixel value, defined from the chromatic part of the digital video input image, is assigned an address to be operated on by values in individual color LUTs. For a desired change in an individual color of that image, a new digital video output image is produced featuring the desired change in the individual color without affecting the remaining colors of that same image. Application of the disclosed method to display of digital video images precludes the need to convert video components (for example, YCrCb) into RGB (red, green, blue) components.

Selective color control using the just described method enables viewers of real time digital video images to do two things currently not achievable using conventional methods of color control of real time digital video images. Firstly, to very accurately set or adjust individual colors of a given real time digital video image to the actual colors of the subject of the image, and, secondly, to very accurately modify or alter colors of a given video image to produce desired special effects in that real time digital video image.

However, the just described method is notably limited because there is description of selectively controlling only the saturation or intensity, and not the hue, of individual colors of real time digital video images. Additionally, the disclosed method is based on using an algorithm which is particularly described with respect to real time digital video images featuring colors or color components characterized by linear combinations of the chromatic parts, Cr and Cb, or, U and V, in YCrCb or YUV luminance/chromatic color space, and there is no particular description with respect to other formats of real time digital video images, such as the RGB or YCM color space formats.

To date, the inventor is not aware of prior art teaching of a method for independently controlling hue of individual colors in a real time digital video image, without affecting the hue and/or saturation of other colors in the same real time digital video image.

There is thus a need for, and it would be highly advantageous to have a method for independently controlling hue or saturation of individual colors in a real time digital video image, without affecting the hue or saturation of any other color in the same real time digital video image. Moreover, there is a need for such a method for controlling color of real time digital video images which is efficient and robust, and is particularly applicable to real time digital video images featuring colors or color components characterized by linear combinations of the basic colors of red, green, and blue, in RGB color space.

SUMMARY OF THE INVENTION

The present invention relates to a method for independently controlling hue or saturation of individual colors in a real time digital video image, without affecting the hue or saturation of any other color in the same real time digital video image.

Thus, according to the present invention, there is provided a method for independently controlling hue or saturation of individual colors in a real time digital video image, comprising the steps of: (a) receiving and characterizing the real time digital video input image featuring input image pixels; (b) selecting to independently change the hue or the saturation of an individual color in the real time digital video input image, by selecting an independent color hue control delta value or an independent color saturation control delta value, respectively, wherein the independent color hue control delta value represents an extent of change in the hue of the selected individual color and wherein the independent color saturation control delta value represents an extent of change in the saturation of the selected individual color; (c) identifying a plurality of the input image pixels having the selected individual color in the real time digital video input image with the hue or the saturation selected to be independently changed, by performing arithmetic and logical operations using input image pixel values of each input image pixel of the real time digital video input image; (d) determining corresponding output image pixel values for each of the plurality of the input image pixels identified as having the selected individual color in the real time digital video input image with the hue or the saturation selected to be independently changed, by separately evaluating independent color hue control functions or independent color saturation control functions, respectively, using the input image pixel values of the plurality of the input image pixels, and using corresponding selected independent color hue control delta value or the corresponding selected independent color saturation control delta value, for forming a corresponding plurality of output image pixels having the selected individual color with the hue or the saturation selected to be independently changed; and (e) displaying a real time digital video output image including the corresponding plurality of the output image pixels having the selected individual color with the hue or the saturation selected to be independently changed in the real time digital video input image, whereby the hue or the saturation of the selected individual color in the real time digital video input image has been changed without affecting the hue or the saturation of any other individual color in the real time digital video input image.

According to another aspect of the present invention, there is provided a system for independently controlling hue or saturation of individual colors in a real time digital video image, comprising: (a) a real time digital video image display device displaying the real time digital video image featuring input image pixels; (b) a master control device in operative electronic communication with and controlling the real time digital video image display device; and (c) a viewer of the real time digital video image display device operating the master control device for selecting to independently change the hue or the saturation of an individual color in the real time digital video input image, by selecting an independent color hue control delta value or an independent color saturation control delta value featured on the master control device, respectively, wherein the independent color hue control delta value represents an extent of change in the hue of the selected individual color and wherein the independent color saturation control delta value represents an extent of change in the saturation of the selected individual color, whereby the real time digital video image display device in the operative electronic communication with the master control device performs steps including: (i) identifying a plurality of the input image pixels having the selected individual color in the real time digital video input image with the hue or the saturation selected to be independently changed, by performing arithmetic and logical operations using input image pixel values of each input image pixel of the real time digital video input image; (ii) determining corresponding output image pixel values for each of the plurality of the input image pixels identified as having the selected individual color in the real time digital video input image with the hue or the saturation selected to be independently changed, by separately evaluating independent color hue control functions or independent color saturation control functions, respectively, using the input image pixel values of the plurality of the input image pixels, and using corresponding selected independent color hue control delta value or the corresponding selected independent color saturation control delta value, for forming a corresponding plurality of output image pixels having the selected individual color with the hue or the saturation selected to be independently changed; and (iii) displaying a real time digital video output image including the corresponding plurality of the output image pixels having the selected individual color with the hue or the saturation selected to be independently changed in the real time digital video input image, whereby the hue or the saturation of the selected individual color in the real time digital video input image has been changed without affecting the hue or the saturation of any other individual color in the real time digital video input image.

According to further features in preferred embodiments of the invention described below, the real time digital video input image is of a format selected from the group consisting of RGB format, YCrCb format, and, YUV format, whereby the individual colors of one format can be characterized by the individual colors of a second format by using appropriate linear transformations between the formats.

According to further features in preferred embodiments of the invention described below, the real time digital video input image features basic colors red, green, and blue, and, complementary colors yellow, cyan, and magenta, in RGB color space, whereby values of the complementary colors are expressed in terms of and evaluated from linear combinations of values of the basic colors.

According to further features in preferred embodiments of the invention described below, the real time digital video input image features basic colors yellow, cyan, and magenta, and, complementary colors red, green, and blue, in YCM color space, whereby values of the complementary colors are expressed in terms of and evaluated from linear combinations of values of the basic colors.

The present invention successfully overcomes limitations of presently known techniques and methods for real time controlling color, in general, and independently controlling color components such as hue and saturation, in particular, of real time digital video images. Independently controlling hue or saturation of individual colors in a real time digital video image, without affecting the hue or saturation of any other color in the same real time digital video image, enables viewers of video images to do two things currently not achievable using conventional methods for controlling color of real time digital video images. Firstly, to very accurately, yet independently, change or adjust the hue or saturation of individual colors of a given real time digital video image according to the actual hue or saturation of individual colors of the subject of the real time digital video image, and, secondly, to very accurately, yet independently, modify or alter the hue or saturation of individual colors of a given video image to produce desired special effects in the real time digital video image. These benefits of the present invention are immediately applicable to the television and movie industries, where it is critically important for real time digital video images to represent actual hue or saturation of individual colors of a real time digital video image, and to have the capability of producing special effects to real time digital video images.

Implementation of the method of the present invention for independently controlling hue or saturation of individual colors in a real time digital video image, without affecting the hue or saturation of any other color in the same real time digital video image involves performing or completing selected tasks or steps manually, automatically, or a combination thereof. Moreover, according to actual instrumentation and/or equipment used for implementing a particular preferred embodiment of the disclosed method, several selected steps of the present invention could be performed by hardware, by software on any operating system of any firmware, or a combination thereof. In particular, as hardware, selected steps of the invention could be performed by a computerized network, a computer, a computer chip, an electronic circuit, hard-wired circuitry, or a combination thereof, involving any number of digital and/or analog, electrical and/or electronic, components, operations, and protocols. Additionally, or alternatively, as software, selected steps of the invention could be performed by a data processor, such as a computing platform, executing a plurality of computer program types of software instructions or protocols using any suitable computer operating system.

DESCRIPTION OF THE PREFERRED EMBODIMENTS

The present invention relates to a method for independently controlling hue or saturation of individual colors in a real time digital video image, without affecting the hue or saturation of any other color in the same real time digital video image.

The method of the present invention introduces the novelty of independently controlling hue, in addition to, but separate from, controlling saturation, of individual colors in a real time digital video image, without affecting the hue or saturation of any other color in the same real time digital video image. This is accomplished, in part, by selecting a uniquely defined independent color hue control delta value or a uniquely defined independent color saturation control delta value, where the delta value represents an extent or magnitude of change in hue or saturation, respectively, of the selected individual color, and, in part, by separately evaluating uniquely defined independent color hue control functions or uniquely defined independent color saturation control functions, using input image pixel values of the plurality of input image pixels identified as having the individual color in the real time digital video input image whose hue or saturation was selected to be independently changed, and using the corresponding selected independent color hue control delta value or the corresponding selected independent color saturation control delta value, respectively, for forming and displaying a corresponding plurality of output image pixels having the individual color whose hue or saturation was selected to be independently changed.

It is to be understood that the invention is not limited in its application to the details of the order or sequence of steps of operation or implementation, set forth in the following description. For example, the following description particularly refers to real time digital video images featuring colors or color components characterized by linear combinations of the basic colors red, green, and, blue, in RGB color space, which are used for defining and evaluating the complementary colors or color components yellow, cyan, and magenta, in the RGB color space, in order to illustrate implementation of the present invention. The method of the present invention is applicable to other formats of real time digital video images featuring colors or color components characterized by individual colors or color components in other types of color space, such as real time digital video images featuring colors or color as components characterized by linear combinations of the basic colors yellow, cyan, and magenta, in YCM color space, or, real time digital video images featuring color components characterized by chromatic parts, Cr and Cb, or, U and V, in YCrCb or YUV luminance/chromatic color space, by applying appropriate linear transformations between the RGB color space and the YCM, or, the YCrCb or YUV luminance/chromatic color space. Accordingly, the invention is capable of other embodiments or of being practiced or carried out in various ways. Also, it is to be understood that the phraseology and terminology employed herein are for the purpose of description and should not be regarded as limiting.

The method for independently controlling hue or saturation of individual colors in a real time digital video image, of the present invention, is herein disclosed for the first time, and is neither anticipated or obviously derived from the "Method Of Selective Color Control Of Digital Video Images", as disclosed by same inventor in PCT International Patent Application Publication No. WO/00052938, or in the priority U.S. Pat. No. 6,122,012.

Steps, components, operation, and implementation of the method for independently controlling hue or saturation of individual colors in a real time digital video image, according to the present invention, are better understood with reference to the following description.

In Step (a) of the method of the present invention, there is receiving and characterizing a real time digital video input image.

Preferably, there is receiving a real time digital video input image, I, featuring colors or color components characterized by linear combinations of the basic colors red, green, and blue, in RGB color space, whereby the real time digital video input image, I, features basic colors red, green, and blue, and, complementary colors yellow, cyan, and magenta, in the RGB color space featuring a color based three-dimensional coordinate system. As previously described above, the method of the present invention is applicable to other formats, such as YCM, YCrCb, or YUV formats, of real time digital video images featuring colors or color components characterized by individual colors or color components in other types of color space, such as YCM, YCrCb or YUV color spaces, respectively, by using appropriate linear transformations between color spaces.

Accordingly, for RGB color space, $I[i,j: R_{in}, G_{in}, B_{in}]$ represents each of a plurality of input image pixels of the real time digital video input image, I, which can be plotted in an input grid of a real time digital video image display device, whose position coordinates in the input grid are indicated by row i, and column j. For the real time digital video input image, I, of size M rows by N columns, position indices (i,j) are preferably limited to the input image size as follows: i: 0,1,2, . . . M−1; and j: 0,1,2, . . . N−1. In general, indices i and j are real or integer.

For each input image pixel, I[i,j: $R_{in}$, $G_{in}$, $B_{in}$], individual basic colors or color components, red, green, and blue, have color or color component values represented by the terms $R_{in}$, $G_{in}$, and $B_{in}$, respectively, and, individual complementary colors or color components yellow, cyan, and magenta, have color or color component values represented by the terms $Y_{in}$, $C_{in}$, and $M_{in}$, respectively. Color or color component values, $Y_{in}$, $C_{in}$, and $M_{in}$, of the individual complementary colors or color components, yellow, cyan, and magenta, respectively, are expressed in terms of, and evaluated from, linear combinations of the color or color component values, $R_{in}$, $G_{in}$, and $B_{in}$, of the individual basic colors or color components, red, green, and blue, respectively.

In Step (b), there is selecting to independently change hue or saturation of an individual color in the real time digital video input image, by selecting an independent color hue control delta value or an independent color saturation control delta value, respectively, where the independent color hue control delta value represents an extent or magnitude of change in hue of the selected individual color, and, where the independent color saturation control delta value represents an extent or magnitude of change in saturation of the selected individual color.

In particular, there is selecting to independently change, that is, change clockwise or counterclockwise, hue, or, to independently change, that is, increase or decrease, saturation, of an individual color, such as red, green, blue, yellow, cyan, or, magenta, in the real time digital video input image, I, displayed on the video image display device.

The extent or magnitude of change in hue, herein, also referred to as 'H', of the selected individual color, herein also referred to as 'clr', is represented by an independent color hue control delta value, herein generally indicated as Hclr, where the term 'clr' is symbolic of a particular selected individual color, such as red, green, blue, yellow, cyan, or, magenta, in the real time digital video input image, I. Accordingly, there is an independent color hue control delta value, Hclr, assigned to each color or color component in the real time digital video input image, I, whose hue is potentially to be changed. Thus, with respect to RGB color space, there is Hr, Hg, Hb, Hy, Hc, and Hm, representing the independent color hue control delta values of red, green, blue, yellow, cyan, and, magenta, respectively.

In principle, the numerical range, represented by an interval, [h1, h2], where h1 and h2 are integers, of the independent color hue control delta value, Hclr, in general, and of each Hr, Hg, Hb, Hy, Hc, and Hm, in particular, is arbitrary. For implementation, preferably, the numerical range of Hclr, in general, and of each Hr, Hg, Hb, Hy, Hc, and Hm, in particular, is between −1 and +1, corresponding to the interval [−1,+1], which is equivalent to any other interval, [h1, h2], by performing linear or non-linear transformation between these particular intervals.

The extent or magnitude of change in saturation, herein, also referred to by 'S', of the selected individual color, clr, is represented by an independent color saturation control delta value, herein generally indicated as Sclr, where, as previously described, the term 'clr' is symbolic of a particular selected individual color, such as red, green, blue, yellow, cyan, or, magenta, in the real time digital video input image, I. Accordingly, there is an independent color saturation control delta value, Sclr, assigned to each color or color component in the real time digital video input image, I, whose saturation is potentially to be changed. Thus, with respect to RGB color space, there is Sr, Sg, Sb, Sy, Sc, and Sm, representing the independent color saturation control delta values of red, green, blue, yellow, cyan, and, magenta, respectively.

In principle, the numerical range, represented by an interval, [s1, s2], where s1 and s2 are integers, of the independent color saturation control delta value, Sclr, in general, and of each Sr, Sg, Sb, Sy, Sc, and Sm, in particular, is arbitrary. For implementation, preferably, the numerical range of Sclr, in general, and of each Sr, Sg, Sb, Sy, Sc, and Sm, in particular, is between −1 and +1, corresponding to the interval [−1,+1], which is equivalent to any other interval, [s1, s2], by performing linear or non-linear transformation between these particular intervals.

Accordingly, the operative result of Step (b) is that of selecting either an independent color hue control delta value, Hclr, or, an independent color saturation delta value, Sclr, which is not zero, that is, where only one of the following is selected at a given time: Hclr>0(changing color hue clockwise), or, Hclr<0(changing color hue counterclockwise), or, Sclr>0(increasing color saturation), or, Sclr<0(decreasing color saturation), thereby, indicating an independent change in either hue or saturation of the selected individual color is to be made by continuing with the following steps.

As previously indicated above, a main aspect of novelty of the present invention is that of enabling one to independently control, that is, to independently change or adjust, by increasing or decreasing, hue or saturation of each individual color in a real time digital video image, without affecting the hue or saturation of any other color in the same real time digital video image. Accordingly, as part of implementing the method, there is using the independent color hue control delta value, Hclr, or, the independent color saturation control delta value, Sclr, where the delta value represents an extent or magnitude of change in hue or saturation of a particular selected individual color, and, where the independent color hue control delta value is completely independent or separate from the independent color saturation control delta value. More specifically stated, selecting to independently change hue of a particular individual color by a particular extent or magnitude, represented by Hclr, is completely independent or separate from, and, has no affect on the hue of any other color in the same real time digital video image, or, on the saturation of the particular selected individual color in the same real time digital video image. Additionally, selecting to independently change saturation of a particular individual color by a particular extent or magnitude, represented by Sclr, is completely independent or separate from, and, has absolutely no affect on the saturation of any other color in the same real time digital video image, or, on the hue of the particular selected individual color in the same real time digital video image.

Consistent with each respective definition, whereby the independent color hue control delta value, Hclr, and, the independent color saturation delta value, Sclr, each represent an extent or magnitude of change in hue or saturation, respectively, of a selected individual color, the respective delta values therefore represent a finite increment in hue or saturation, where hue and saturation of the individual colors or color components of the real time digital video input image, I, are variable within respective ranges of hue and saturation. Without going into details of color theory and applications thereof, which are well known to those skilled in the art of video imaging and video image processing, the independent color hue control delta value, Hclr, used in the method of the present invention, is herein defined to be proportional to the extent or magnitude of change, or, the finite increment, of the hue or angle of a selected individual color or color component in a direction, clockwise or counterclockwise, towards other individual colors or color components, characterized in a particular color space, for example, RGB color space, featuring a color based three-dimensional coordinate system, within the real time digital video input image, I. Additionally, the independent color saturation control delta value, Sclr, used in the method of the present invention, is herein defined to be proportional to the extent or magnitude of change, or, the finite increment, increasing or decreasing, of the saturation or intensity of an individual color or color component, characterized in the same color space, for example, RGB color space, featuring the color based three-dimensional coordinate system, within the real time digital video input image, I.

Specific ranges, and values, of hue and saturation of the individual colors or color components featured in the real time digital video input image are typically pre-determined or set according to design and manufacture of hardware and/or software of a particular real time digital video display device and associated equipment and peripherals, such as a built-in color controller, or, a wireless remote color controller, used for operating the particular real time digital video display device. Accordingly, for implementing the method of the present invention, specific ranges, and values, in particular, [h1, h2], of the independent color hue control delta value, Hclr, and, specific ranges, and values, in particular, [s1, s2], of the independent color saturation delta value, Sclr, are also pre-determined or set according to design and manufacture of hardware and/or software of the particular real time digital video display device and associated equipment and peripherals used for operating the particular real time digital video display device.

In Step (c), there is identifying a plurality of the input image pixels having the individual color in the real time digital video input image whose hue or saturation was selected to be independently changed, by performing arithmetic and logical operations using input image pixel values of each input image pixel of the real time digital video input image.

More specifically, there is identifying a plurality of the input image pixels, I[i,j: $R_{in}$, $G_{in}$, $B_{in}$], in the real time digital video input, I, image having the individual color in the real time digital video input image whose hue or saturation was selected to be independently changed, by performing arithmetic and logical operations selected from the group consisting of addition, subtraction, multiplication, division, equal to, greater than, less than, absolute value of, and, combinations thereof, using input image pixel values, $R_{in}$, $G_{in}$, $B_{in}$, of each input image pixel, I[i,j: $R_{in}$, $G_{in}$, $B_{in}$], of the real time digital video input image. Six cases of Step (c) are described, corresponding to the six colors or color components, red, green, blue, yellow, cyan, and, magenta, associated with the input image pixel values, $R_{in}$, $G_{in}$, $B_{in}$, respectively, of input image pixels, I[i,j: $R_{in}$, $G_{in}$, $B_{in}$], of the real time digital video input image, I, characterized by RGB color space. In Step (c) and hereinafter, where applicable, the asterisk symbol, *, represents the mathematical operation of multiplication, and, the double bars symbol, | |, represents the mathematical operation of absolute value of the value indicated inside the double bars.

It is emphasized that this step is for identifying only, and not for changing or affecting, input image pixels having the individual color in the real time digital video input image whose hue or saturation was selected to be independently changed. Moreover, according to the result of previously described Step (b), for selecting to independently change hue or saturation of an individual color in the real time digital video input image, only one of the following described six cases is implemented according to that selection, whereby, only one independent color hue control delta value, Hclr, or, only one independent color saturation delta value, Sclr, of Step (b), is not equal to zero, during a given time or sequence of image processing, for identifying input image pixels having the selected individual color.

In each case 1 through 6, of Step (c), below, the plurality of input image pixels in the real time digital video input image is preferably scanned, row by row, pixel by pixel, for identifying the plurality of input image pixels having the individual color in the real time digital video input image whose hue or saturation was selected to be independently changed. For implementation, either following identifying each input image pixel, one at a time, or, following identifying the entire plurality of input image pixels, as having the individual color in the real time digital video input image whose hue or saturation was selected to be independently changed, each identified input image pixel, or, the identified entire plurality of input image pixels (for example, after saving the entire plurality of identified input image pixels in a memory), respectively, is further processed, by continuing with next Step (d).

In case 1, where the independent red hue control delta value, Hr, or, the independent red saturation delta value, Sr, of Step (b), is not equal to zero, there is identifying each input image pixel having red, R, as the individual color whose hue or saturation was selected to be independently changed, according to the following logical conditions:

$R_{in}$>[Arg+$G_{in}$] and $R_{in}$>[Arb+$B_{in}$], where Arg and Arb are positive constants.

Then, there is continuing with Step (d) below.

In case 2, where the independent green hue control delta value, Hg, or, the independent green saturation delta value, Sg, of Step (b), is not equal to zero, there is identifying each input image pixel having green, G, as the individual color whose hue or saturation was selected to be independently changed, according to the following logical conditions:

$G_{in}$>[Agr+$R_{in}$] and $G_{in}$>[Agb+$B_{in}$], where Agr and Agb are positive constants.

Then, there is continuing with Step (d) below.

In case 3, where the independent blue hue control delta value, Hb, or, the independent blue saturation delta value, Sb, of Step (b), is not equal to zero, there is identifying each input image pixel having blue, B, as the individual color whose hue or saturation was selected to be independently changed, according to the following logical conditions:

$B_{in}$>[Abg+$G_{in}$] and $B_{in}$>[Abr+$R_{in}$], where Abg and Abr are positive constants.

Then, there is continuing with Step (d) below.

In case 4, where the independent yellow hue control delta value, Hy, or, the independent yellow saturation delta value, Sy, of Step (b), is not equal to zero, there is identifying each input image pixel having yellow, Y, as the individual color whose hue or saturation was selected to be independently changed, according to the following logical conditions:

$R_{in}$>[Arby+$B_{in}$] and $G_{in}$>[Agby+$B_{in}$] and |$R_{in}$−$G_{in}$|<Ty, where Arby, Agby, and Ty, are positive constants.

Then, there is continuing with Step (d) below.

In case 5, where the independent cyan hue control delta value, Hc, or, the independent cyan saturation delta value, Sc, of Step (b), is not equal to zero, there is identifying each input image pixel having cyan, C, as the individual color whose hue or saturation was selected to be independently changed, according to the following logical condition:

$G_{in}$>[Agrc+$R_{in}$] and $B_{in}$>[Abrc+$R_{in}$] and |$G_{in}$−$B_{in}$|<Tb, where Agrc, AbrC, and Tb, are positive constants.

Then, there is continuing with Step (d) below.

In case 6, where the independent magenta hue control delta value, Hm, or, the independent magenta saturation delta value, Sm, of Step (b), is not equal to zero, there is identifying each input image pixel having magenta, M, as the individual color whose hue or saturation was selected to be independently changed, according to the following logical condition:

$R_{in}$>[Argm+$G_{in}$] and $B_{in}$>[Abgm+$G_{in}$] and |$R_{in}$−$B_{in}$|<Tm, where Argm, Abgm, and Tm, are positive constants.

Then, there is continuing with Step (d) below.

In Step (d), there is determining corresponding output image pixel values for each of the plurality of input image pixels identified as having the individual color in the real time digital video input image whose hue or saturation was selected to be independently changed, by separately evaluating independent color hue control functions or independent color saturation control functions, respectively, using the input image pixel values of the plurality of input image pixels identified as having the individual color in the real time digital video input image whose hue or saturation was selected to be independently changed, and using the corresponding selected independent color hue control delta value or the corresponding selected independent color saturation control delta value, respectively, for forming a corresponding plurality of output image pixels having the individual color whose hue or saturation was selected to be independently changed.

For RGB color space, O[s,t: $R_{out}$, $G_{out}$, $B_{out}$] represents each of a plurality of output image pixels of the real time digital video output image, O, which can be plotted in an output grid of a real time digital video image display device, whose position coordinates in the output grid are indicated by row s, and column t. For the real time digital video output image, O, of size M' rows by N' columns, position indices (s,t) are preferably limited to the output image size as follows: s: 0,1,2, ... M'−1; and t: 0,1,2, ... N'−1. In general, indices s and t are real or integer.

For each output image pixel, O[s,t: $R_{out}$, $G_{out}$, $B_{out}$], individual basic colors or color components, red, green, and blue, have color or color component values represented by the terms $R_{out}$, $G_{out}$, and $B_{out}$, respectively, and, individual complementary colors or color components yellow, cyan, and magenta, have color or color component values represented by the terms $Y_{out}$, $C_{out}$, and $M_{out}$, respectively. As previously indicated in Step (a) above, color or color component values, $Y_{out}$, $C_{out}$, and $M_{out}$, of the individual complementary colors or color components, yellow, cyan, and magenta, respectively, are expressed in terms of, and evaluated from, linear combinations of the color or color component values, $R_{out}$, $G_{out}$, and $B_{out}$, of the individual basic colors or color components, red, green, and blue, respectively.

Accordingly, in Step (d), more specifically, there is determining corresponding output image pixel values, $R_{out}$, $G_{out}$, $B_{out}$, for each of the plurality of input image pixels, I[i,j: $R_{in}$, $G_{in}$, $B_{in}$], identified, according to previously described Step (c), as having the individual color in the real time digital video input image whose hue or saturation was selected to be independently changed, by separately evaluating independent color hue control functions, $F_h$(color-hue), or, independent color saturation control functions, $F_s$(color-saturation), respectively, using the input image pixel values, $R_{in}$, $G_{in}$, $B_{in}$, of the plurality of input image pixels, I[i,j: $R_{in}$, $G_{in}$, $B_{in}$], identified as having the individual color in the real time digital video input image whose hue or saturation was selected to be independently changed, and using the corresponding selected independent color hue control delta value, Hclr, or the corresponding selected independent color saturation control delta value, Sclr, respectively, for forming a corresponding plurality of output image pixels, O[s,t: $R_{out}$, $G_{out}$, $B_{out}$], having the individual color whose hue or saturation was selected to be independently changed.

Except for the plurality of input image pixels, I[i,j: $R_{in}$, $G_{in}$, $B_{in}$], identified as having the individual color in the real time digital video input image whose hue or saturation was selected to be independently changed, the hue or saturation of no other color is affected in the remaining plurality of input image pixels, I[i,j: $R_{in}$, $G_{in}$, $B_{in}$], in the same real time digital video input image.

For implementation, either following determining corresponding output image pixel values, $R_{out}$, $G_{out}$, $B_{out}$, for each input image pixel, I[i,j: $R_{in}$, $G_{in}$, $B_{in}$], one at a time, or, following determining corresponding output image pixel values, $R_{out}$, $G_{out}$, $B_{out}$, for the entire plurality of input image pixels, I[i,j: $R_{in}$, $G_{in}$, $B_{in}$], identified as having the individual color in the real time digital video input image whose hue or saturation was selected to be independently changed, each determined output image pixel, O[s,t: $R_{out}$, $G_{out}$, $B_{out}$], or, the identified entire plurality of output image pixels, O[s,t: $R_{out}$, $G_{out}$, $B_{out}$], (for example, after saving the entire plurality of determined output image pixels in a memory), respectively, is further processed, by continuing with next Step (e).

In Step (d), two scenarios, scenario (A), for independently changing, clockwise or counterclockwise, hue of an individual color in the real time digital video input image, I, and, scenario (B), for independently changing, increasing or decreasing, saturation of an individual color in the real time digital video input image, I, are described herein. Only one scenario, scenario (A), or, scenario (B), is operative during a given time or sequence of processing the real time digital video input image, I, according to the result of previously described Step (b), for selecting to independently change hue or saturation of an individual color in the real time digital video input image, I. Additionally, for each scenario, (A) and (B), six particular cases are described, corresponding to each of the three individual basic colors or color components, red, green, and blue, and, to each of the three individual complementary colors or color components, yellow, cyan, and, magenta, associated with the input image pixel values, $R_{in}$, $G_{in}$, $B_{in}$, respectively, of input image pixels, I[i,j: $R_{in}$, $G_{in}$, $B_{in}$], of the real time digital video input image, I, characterized by RGB color space.

In scenario (A), there is determining corresponding output image pixel values, $R_{out}$, $G_{out}$, $B_{out}$, for each of the plurality of input image pixels, I[i,j: $R_{in}$, $G_{in}$, $B_{in}$], identified as having the individual color in the real time digital video input image whose hue was selected to be independently changed, clockwise or counterclockwise, according to the non-zero independent color hue control delta value, Hclr, previously selected in Step (b), above.

First, in scenario (A), for independently controlling hue only of an individual color, there is described a first generalized algorithm, featuring evaluating independent color hue control functions, $F_h$(color-hue), applicable to the three particular cases corresponding to permutations, that is, RGB, GBR, and, BRG, of the three individual basic colors or color components, red, green, and blue, associated with the input image pixel values, $R_{in}$, $G_{in}$, and, $B_{in}$, respectively, of input image pixels, I[i,j: $R_{in}$, $G_{in}$, $B_{in}$], of the real time digital video input image, I, characterized by RGB color space, and using the corresponding selected independent color hue control delta value, Hclr, for forming a corresponding plurality of output image pixels, O[s,t: $R_{out}$, $G_{out}$, $B_{out}$], having the individual color whose hue was selected to be independently changed.

For Hclr>0(changing color hue clockwise towards Vclr1$_{in}$ and Vclr2$_{in}$)

$F_1$(color-hue)=[(1−Hclr)*Vclr1$_{in}$+(Hclr*Vclr2$_{in}$)], $F_2$(color-hue)=[(1−Hclr)*Vclr2$_{in}$+(Hclr*Vclr1$_{in}$)], $F_3$(color-hue)=Vclr3$_{in}$;

For Hclr<0(changing color hue counterclockwise towards Vclr1$_{in}$ and Vclr3$_{in}$)

Hclr is set equal to −Hclr, and $F_1$(color-hue)=[(1−Hclr)*Vclr1$_{in}$+(Hclr*Vclr3$_{in}$)], $F_2$(color-hue)=Vclr2$_{in}$, $F_3$(color-hue)=[(1−Hclr)*Vclr3$_{in}$+(Hclr*Vclr1$_{in}$)];

for forming:

Vclr1$_{out}$=$F_1$(color-hue),

Vclr2$_{out}$=$F_2$(color-hue), and

Vclr3$_{out}$=$F_3$(color-hue), where Hclr corresponds to the independent color hue control delta value previously defined and selected in Step (b), above, specifically, of the current selected individual color, clr, and, in particular, of the current selected individual color red, green, or, blue; the $F_h$(color-hue), for h=1 to 3, are independent color hue control functions; Vclr1$_{in}$, Vclr2$_{in}$, and Vclr3$_{in}$, are input image pixel values of the three individual basic colors, clr1, clr2, and clr3, respectively, and, in particular, are used for permuting $R_{in}$, $G_{in}$, and $B_{in}$, of input image pixels, I[i,j: $R_{in}$, $G_{in}$, $B_{in}$], of the real time digital video input image, I, characterized by RGB color space; and, Vclr1$_{out}$, Vclr2$_{out}$, and Vclr3$_{out}$, are corresponding output image pixel values of the three individual basic colors, clr1, clr2, and clr3, respectively, and, in particular, are used for similarly permuting $R_{out}$, $G_{out}$, and $B_{out}$, of output image pixels, O[s,t: $R_{out}$, $G_{out}$, $B_{out}$], of the real time digital video output image, O, characterized by RGB color space.

In case 1 of scenario (A), where the independent red hue control delta value, Hr, of Step (b), is not equal to zero, there is determining corresponding output image pixel values, $R_{out}$, $G_{out}$, $B_{out}$, for each of the plurality of input image pixels, I[i,j: $R_{in}$, $G_{in}$, $B_{in}$], identified as having red as the individual color in the real time digital video input image whose hue was selected to be independently changed, by separately evaluating independent red hue control functions, $F_h$(red-hue), using the input image pixel values, $R_{in}$, $G_{in}$, $B_{in}$, of the plurality of input image pixels, I[i,j: $R_{in}$, $G_{in}$, $B_{in}$], identified as having red as the individual color in the real time digital video input image whose hue was selected to be independently changed, for forming a set of output image pixels, O[s,t: $R_{out}$, $G_{out}$, $B_{out}$], having red as the individual color whose hue was selected to be independently changed. In case 1, the previously described first generalized algorithm, above, is applied, where the colors, clr1, clr2, clr3, correspond to the particular color permutation of R, G, B, respectively, as follows:

For Hr>0(changing red hue clockwise towards yellow and green)

$F_1$(red-hue)=[(1−Hr)*$R_{in}$+(Hr*$G_{in}$)], $F_2$(red-hue)=[(1−Hr)*$G_{in}$+(Hr*$R_{in}$)], $F_3$(red-hue)=$B_{in}$;

For Hr<0(changing red hue counterclockwise towards magenta and blue)

Hr is set equal to −Hr, and $F_1$(red-hue)=[(1−Hr)*$R_{in}$+(Hr*$B_{in}$)], $F_2$(red-hue)=$G_{in}$, $F_3$(red-hue)=[(1−Hr)*$B_{in}$+(Hr*$R_{in}$)];

for forming:

$R_{out}$=$F_1$(red-hue), $G_{out}$=$F_2$(red-hue), and $B_{out}$=$F_3$(red-hue), where all the necessary input data and information are known for determining all of the corresponding output image pixel values for each output image pixel.

Changing red hue of the real time digital video input image, I, whereby Hr>0, corresponds to changing red color, R, of the plurality of input image pixels, I[i,j: $R_{in}$, $G_{in}$, $B_{in}$], clockwise towards yellow and green colors in the RGB color space featuring the color based three-dimensional coordinate system, for forming the real time digital video output image, O, featuring the corresponding plurality of digital output image pixels, O[s,t: $R_{out}$, $G_{out}$, $B_{out}$], having red as the individual color whose hue was selected to be independently increased. Changing red hue of the real time digital video input image, I, whereby Hr<0, corresponds to changing red color, R, of the plurality of input image pixels, I[i,j: $R_{in}$, $G_{in}$, $B_{in}$], counterclockwise towards magenta and blue colors in the RGB color space featuring the color based three-dimensional coordinate system, for forming the real time digital video output image, O, featuring the corresponding plurality of digital output image pixels, O[s,t: $R_{out}$, $G_{out}$, $B_{out}$], having red as the individual color whose hue was selected to be independently decreased.

In case 2 of scenario (A), where the independent green hue control delta value, Hg, of Step (b), is not equal to zero, there is determining corresponding output image pixel values, $R_{out}$, $G_{out}$, $B_{out}$) for each of the plurality of input image pixels, I[i,j: $R_{in}$, $G_{in}$, $B_{in}$], identified as having green as the individual color in the real time digital video input image whose hue was selected to be independently changed, by separately evaluating independent red hue control functions, $F_h$(green-hue), using the input image pixel values, $R_{in}$, $G_{in}$, $B_{in}$, of the plurality of input image pixels, I[i,j: $R_{in}$, $G_{in}$, $B_{in}$], identified as having green as the individual color in the real time digital video input image whose hue was selected to be independently changed, for forming a set of output image pixels, O[s,t: $R_{out}$, $G_{out}$, $B_{out}$], having green as the individual color whose hue was selected to be independently changed. In case 2, the previously described first generalized algorithm, above, is applied, where the colors, clr1, clr2, clr3, correspond to the particular color permutation of G, B, R, respectively, as follows:

For Hg>0(changing green hue clockwise towards cyan and blue)

$F_1$(green-hue)=[(1−Hg)*$G_{in}$+(Hg*$B_{in}$)], $F_2$(green-hue)=[(1−Hg)*$B_{in}$+(Hg*$G_{in}$)], $F_3$(green-hue)=$R_{in}$;

For Hg <0(changing green hue counterclockwise towards yellow and red)

Hg is set equal to −Hg, and $F_1$(green-hue)=[(1−Hg)*$G_{in}$+(Hg*$R_{in}$)], $F_2$(green-hue)=$B_{in}$, $F_3$(green-hue)=[(1−Hg)*$R_{in}$+(Hg*$G_{in}$)];

for forming:

$G_{out}$=$F_1$(green-hue), $B_{out}$=$F_2$(green-hue), and $R_{out}$=$F_3$(green-hue), where all the necessary input data and information are known for determining all of the corresponding output image pixel values for each output image pixel.

Changing green hue of the real time digital video input image, I, whereby Hg>0, corresponds to changing green color, G, of the plurality of input image pixels, I[i,j: $R_{in}$, $G_{in}$, $B_{in}$], clockwise towards cyan and blue colors in the RGB color space featuring the color based three-dimensional coordinate system, for forming the real time digital video output image, O, featuring the corresponding plurality of digital output image pixels, O[s,t: $R_{out}$, $G_{out}$, $B_{out}$], having green as the individual color whose hue was selected to be independently increased. Changing green hue of the real time digital video input image, I, whereby Hg<0, corresponds to changing green color, G, of the plurality of input image pixels, I[i,j: $R_{in}$, $G_{in}$, $B_{in}$], counterclockwise towards yellow and red colors in the RGB color space featuring the color based three-dimensional coordinate system, for forming the real time digital video output image, O, featuring the corresponding plurality of digital output image pixels, O[s,t: $R_{out}$, $G_{out}$, $B_{out}$], having green as the individual color whose hue was selected to be independently decreased.

In case 3 of scenario (A), where the independent blue hue control delta value, Hb, of Step (b), is not equal to zero, there is determining corresponding output image pixel values, $R_{out}$, $G_{out}$, $B_{out}$, for each of the plurality of input image pixels, I[i,j: $R_{in}$, $G_{in}$, $B_{in}$], identified as having blue as the individual color in the real time digital video input image whose hue was selected to be independently changed, by separately evaluating independent blue hue control functions, $F_h$(blue-hue), using the input image pixel values, $R_{in}$, $G_{in}$, $B_{in}$, of the plurality of input image pixels, I[i,j: $R_{in}$, $G_{in}$, $B_{in}$], identified as having blue as the individual color in the real time digital video input image whose hue was selected to be independently changed, for forming a set of output image pixels, O[s,t: $R_{out}$, $G_{out}$, $B_{out}$], having blue as the individual color whose hue was selected to be independently changed. In case 3, the previously described first generalized algorithm, above, is applied, where the colors, clr1, clr2, clr3, correspond to the particular color permutation of B, R, G, respectively, as follows:

For Hb>0(changing blue hue clockwise towards magenta and red)

$F_1$(blue-hue)=[(1−Hb)*$B_{in}$+(Hb*$R_{in}$)],
$F_2$(blue-hue)=[(1−Hb)*$R_{in}$+(Hb*$B_{in}$)],
$F_3$(blue-hue)=$G_{in}$;

For Hb<0(changing blue hue counterclockwise towards cyan and green)

Hb is set equal to −Hb, and
$F_1$(blue-hue)=[(1−Hb)*$B_{in}$+(Hb*$G_{in}$)],
$F_2$(blue-hue)=$R_{in}$,
$F_3$(blue-hue)=[(1−Hb)*$G_{in}$+(Hb*$B_{in}$)];

for forming:

$B_{out}$=$F_1$(blue-hue),
$R_{out}$=$F_2$(blue-hue), and
$G_{out}$=$F_2$(blue-hue), where all the necessary input data and information are known for determining all of the corresponding output image pixel values for each output image pixel.

Changing blue hue of the real time digital video input image, I, whereby Hb>0, corresponds to changing blue color, B, of the plurality of input image pixels, I[i,j: $R_{in}$, $G_{in}$, $B_{in}$], clockwise towards magenta and red colors in the RGB color space featuring the color based three-dimensional coordinate system, for forming the real time digital video output image, O, featuring the corresponding plurality of digital output image pixels, O[s,t: $R_{out}$, $G_{out}$, $B_{out}$], having blue as the individual color whose hue was selected to be independently increased. Changing blue hue of the real time digital video input image, I, whereby Hb<0, corresponds to changing blue color, B, of the plurality of input image pixels, I[i,j: $R_{in}$, $G_{in}$, $B_{in}$], counterclockwise towards cyan and green colors in the RGB color space featuring the color based three-dimensional coordinate system, for forming the real time digital video output image, O, featuring the corresponding plurality of digital output image pixels, O[s,t: $R_{out}$, $G_{out}$, $B_{out}$], having blue as the individual color whose hue was selected to be independently decreased.

Second, in scenario (A), for independently controlling hue only of an individual color, there is described a second generalized algorithm, featuring evaluating independent color hue control functions, $F_h$(color-hue), applicable to the remaining three particular cases corresponding to permutations, that is, YCM, CMY, and, MYC, of the three individual complementary colors or color components, yellow, cyan, and, magenta, expressed in terms of linear combinations of the individual basic colors or color components red, green, and blue, associated with the input image pixel values, $R_{in}$, $G_{in}$, and, $B_{in}$, of input image pixels, I[i,j: $R_{in}$, $G_{in}$, $B_{in}$], of the real time digital video input image, I, characterized by RGB color space, for forming a corresponding plurality of output image pixels, O[s,t: $R_{out}$, $G_{out}$, $B_{out}$], having the individual color whose hue was selected to be independently changed.

Vclr4$_{in}$=(Vclr1$_{in}$+Vclr2$_{in}$)/2,
Vclr5$_{in}$=(Vclr2$_{in}$+Vclr3$_{in}$)/2,
Vclr6$_{in}$=(Vclr1$_{in}$+Vclr3$_{in}$)/2;

For Hclr>0(changing color hue clockwise towards Vclr4$_{in}$ and Vclr5$_{in}$)

$F_1$(color-hue)=[((1−Hclr)*Vclr4$_{in}$)+(Hclr*Vclr5$_{in}$)],
$F_2$(color-hue)=[((1−Hclr)*Vclr5$_{in}$)+(Hclr*Vclr4$_{in}$)],
$F_3$(Color-hue)=[Vclr6$_{in}$];

For Hclr<0(changing color hue counterclockwise towards Vclr4$_{in}$ and Vclr6$_{in}$)

Hclr is set equal to −Hclr, and
$F_1$(color-hue)=[((1−Hclr)*Vclr4$_{in}$)+(Hclr*Vclr6$_{in}$)],
$F_2$(color-hue)=[((1−Hclr)*Vclr6$_{in}$)+(Hclr*Vclr4$_{in}$)],
$F_3$(color-hue)=[Vclr5$_{in}$];

for forming:

Vclr1$_{out}$=$F_1$(color-hue)−$F_2$(color-hue)+$F_3$(color-hue),
Vclr2$_{out}$=$F_1$(color-hue)+$F_2$(color-hue)−$F_3$(color-hue), and
Vclr3$_{out}$=−$F_1$(color-hue)+$F_2$(color-hue)+$F_3$(color-hue), where Hclr corresponds to the independent color hue control delta value previously defined and selected in Step (b), above, specifically, of the current selected individual color, dr, and, in particular, of the current selected individual color yellow, cyan, or, magenta; the $F_h$(color-hue), for h=1 to 3, are independent color hue control functions; Vclr1$_{in}$, Vclr2$_{in}$, and Vclr3$_{in}$, are input image pixel values of the three individual basic colors, clr1, clr2, and clr3, respectively, and, in particular, are used for permuting $R_{in}$, $G_{in}$, and $B_{in}$, of input image pixels, I[i,j: $R_{in}$, $G_{in}$, $B_{in}$], of the real time digital video input image, I, characterized by RGB color space; Vclr4$_{in}$, Vclr5$_{in}$, and Vclr6$_{in}$, are values of the three individual complementary colors, clr4, clr5, and, clr6, respectively, and, in particular, are used for permuting values of yellow, cyan, and magenta, $Y_{in}$, $C_{in}$, $M_{in}$, respectively, expressed in terms of, and evaluated from, linear combinations of the color or color component values, $R_{in}$, $G_{in}$, and $B_{in}$; and, Vclr1$_{out}$, Vclr2$_{out}$, Vclr3$_{out}$, are corresponding output image pixel values of the three individual basic colors, clr1, clr2, and, clr3, respectively, and, in particular, represent the same permutation of $R_{in}$, $G_{in}$, and $B_{in}$, but, of $R_{out}$, $G_{out}$, $B_{out}$, of output image pixels, O[s,t: $R_{out}$, $G_{out}$, $B_{out}$], of the real time digital video output image, O, characterized by RGB color space.

In case 4 of scenario (A), where the independent yellow hue control delta value, Hy, of Step (b), is not equal to zero, there is determining corresponding output image pixel values, $R_{out}$, $G_{out}$, $B_{out}$, for each of the plurality of input image pixels, I[i,j: $R_{in}$, $G_{in}$, $B_{in}$], identified as having yellow as the individual color in the real time digital video input image whose hue was selected to be independently changed, by separately evaluating independent yellow hue control functions, $F_h$(yellow-hue), using the input image pixel values, $R_{in}$, $G_{in}$, $B_{in}$, of the plurality of input image pixels, I[i,j: $R_{in}$, $G_{in}$, $B_{in}$], identified as having yellow as the individual color in the real time digital video input image whose hue was selected to be independently changed, for forming a set of output image pixels, O[s,t: $R_{out}$, $G_{out}$, $B_{out}$], having yellow as the individual color whose hue was selected to be independently changed. In case 4, the previously described second generalized algorithm, above, is applied, where the colors, clr1, clr2, clr3, correspond to the particular color permutation of R, G, B, respectively, and, the colors, clr4, clr5, clr6, correspond to the particular color permutation of Y, C, M, respectively, as follows:

$Y_{in}=(R_{in}+G_{in})/2$,
$C_{in}=(G_{in}+B_{in})/2$,
$M_{in}=(R_{in}+B_{in})/2$;

For Hy>0(changing yellow hue clockwise towards green and cyan)
$F_1$(yellow-hue)=$[((1-Hy)*Y_{in})+(Hy*C_{in})]$,
$F_2$(yellow-hue)=$[((1-Hy)*C_{in})+(Hy*Y_{in})]$,
$F_3$(yellow-hue)=$[M_{in}]$;

For Hy<0(changing yellow hue counterclockwise towards red and magenta)
Hy is set equal to −Hy, and
$F_1$(yellow-hue)=$[((1-Hy)*Y_{in})+(Hy*M_{in})]$,
$F_2$(yellow-hue)=$[((1-Hy)*M_{in})+(Hy*Y_{in})]$,
$F_3$(yellow-hue)=$[C_{in}]$;
for forming:
$R_{out}=F_1$(yellow-hue)$-F_2$(yellow-hue)$+F_3$(yellow-hue),
$G_{out}=F_1$(yellow-hue)$+F_2$(yellow-hue)$-F_3$(yellow-hue), and
$B_{out}=-F_1$(yellow-hue)$+F_2$(yellow-hue)$+F_3$(yellow-hue),
where all the necessary input data and information are known for determining all of the corresponding output image pixel values for each output image pixel.

Changing yellow hue of the real time digital video input image, I, whereby Hy>0, corresponds to changing yellow color, Y, of the plurality of input image pixels, I[i,j: $R_{in}$, $G_{in}$, $B_{in}$], clockwise towards green and cyan colors in the RGB color space featuring the color based three-dimensional coordinate system, for forming the real time digital video output image, O, featuring the corresponding plurality of digital output image pixels, O[s,t: $R_{out}$, $G_{out}$, $B_{out}$], having yellow as the individual color whose hue was selected to be independently increased. Changing yellow hue of the real time digital video input image, I, whereby Hy<0, corresponds to changing yellow color, Y, of the plurality of input image pixels, I[i,j: $R_{in}$, $G_{in}$, $B_{in}$], counterclockwise towards red and magenta colors in the RGB color space featuring the color based three-dimensional coordinate system, for forming the real time digital video output image, O, featuring the corresponding plurality of digital output image pixels, O[s,t: $R_{out}$, $G_{out}$, $B_{out}$], having yellow as the individual color whose hue was selected to be independently decreased.

In case 5 of scenario (A), where the independent cyan hue control delta value, Hc, of Step (b), is not equal to zero, there is determining corresponding output image pixel values, $R_{out}$, $G_{out}$, $B_{out}$, for each of the plurality of input image pixels, I[i,j: $R_{in}$, $G_{in}$, $B_{in}$], identified as having cyan as the individual color in the real time digital video input image whose hue was selected to be independently changed, by separately evaluating independent cyan hue control functions, $F_h$(cyan-hue), using the input image pixel values, $R_{in}$, $G_{in}$, $B_{in}$, of the plurality of input image pixels, I[i,j: $R_{in}$, $G_{in}$, $B_{in}$], identified as having cyan as the individual color in the real time digital video input image whose hue was selected to be independently changed, for forming a set of output image pixels, O[s,t: $R_{out}$, $G_{out}$, $B_{out}$], having cyan as the individual color whose hue was selected to be independently changed. In case 5, the previously described second generalized algorithm, above, is applied, where the colors, clr1, clr2, clr3, correspond to the particular color permutation of G, B, R, respectively, and, the colors, clr4, clr5, clr6, correspond to the particular color permutation of C, M, Y, respectively, as follows:

$C_{in}=(G_{in}+B_{in})/2$,
$M_{in}=(B_{in}+R_{in})/2$,
$Y_{in}=(G_{in}+R_{in})/2$,

For Hc>0(changing cyan hue clockwise towards blue and magenta)
$F_1$(cyan-hue)=$[((1-Hc)*C_{in})+(Hc*M_{in})]$,
$F_2$(cyan-hue)=$[((1-Hc)*M_{in})+(Hc*C_{in})]$,
$F_3$(cyan-hue)=$[Y_{in}]$;

For Hc<0(changing cyan hue counterclockwise towards green and yellow)
Hc is set equal to −Hc, and
$F_1$(cyan-hue)=$[((1-Hc)*C_{in})+(Hc*Y_{in})]$,
$F_2$(cyan-hue)=$[((1-Hc)*Y_{in})+(Hc*C_{in})]$,
$F_3$(cyan-hue)=$[M_{in}]$;
for forming:
$G_{out}=F_1$(cyan-hue)$-F_2$(cyan-hue)$+F_3$(cyan-hue),
$B_{out}=F_1$(cyan-hue)$+F_2$(cyan-hue)$-F_3$(cyan-hue), and
$R_{out}=-F_1$(cyan-hue)$+F_2$(cyan-hue)$+F_3$(cyan-hue),
where all the necessary input data and information are known for determining all of the corresponding output image pixel values for each output image pixel.

Changing cyan hue of the real time digital video input image, I, whereby Hc>0, corresponds to changing cyan color, C, of the plurality of input image pixels, I[i,j: $R_{in}$, $G_{in}$, $B_{in}$], clockwise towards blue and magenta colors in the RGB color space featuring the color based three-dimensional coordinate system, for forming the real time digital video output image, O, featuring the corresponding plurality of digital output image pixels, O[s,t: $R_{out}$, $G_{out}$, $B_{out}$], having cyan as the individual color whose hue was selected to be independently increased. Changing cyan hue of the real time digital video input image, I, whereby Hc<0, corresponds to changing cyan color, C, of the plurality of input image pixels, I[i,j: $R_{in}$, $G_{in}$, $B_{in}$], counterclockwise towards green and yellow colors in the RGB color space featuring the color based three-dimensional coordinate system, for forming the real time digital video output image, O, featuring the corresponding plurality of digital output image pixels, O[s,t: $R_{out}$, $G_{out}$, $B_{out}$], having cyan as the individual color whose hue was selected to be independently decreased.

In case 6 of scenario (A), where the independent magenta hue control delta value, Hm, of Step (b), is not equal to zero, there is determining corresponding output image pixel values, $R_{out}$, $G_{out}$, $B_{out}$, for each of the plurality of input image pixels, I[i,j: $R_{in}$, $G_{in}$, $B_{in}$], identified as having magenta as the individual color in the real time digital video input image whose hue was selected to be independently changed, by separately evaluating independent cyan hue control functions, $F_h$(magenta-hue), using the input image pixel values, $R_{in}$, $G_{in}$, $B_{in}$, of the plurality of input image pixels, I[i,j: $R_{in}$, $G_{in}$, $B_{in}$], identified as having magenta as the individual color in the real time digital video input image whose hue was selected to be independently changed, for forming a set of output image pixels, O[s,t: $R_{out}$, $G_{out}$, $B_{out}$], having magenta as the individual color whose hue was selected to be independently changed. In case 6, the previously described second generalized algorithm, above, is applied, where the colors, clr1, clr2, clr3, correspond to the particular color permutation of B, R, G, respectively, and, the colors, clr4, clr5, clr6, correspond to the particular color permutation of M, Y, C, respectively, as follows:

$M_{in=(Bin+Rin)/2}$, $Y_{in=(Rin+Gin)/2}$, $C_{in=(Bin+Gin)/2}$;

For Hm>0(changing magenta hue clockwise towards red and yellow)

$F_1(\text{magenta-hue})=[((1-Hm)*M_{in})+(Hm*Y_{in})]$, $F_2(\text{magenta-hue})=[((1-Hm)*Y_{in})+(Hm*M_{in})]$, $F_3(\text{magenta-hue})=[C_{in}]$;

For Hm<0(changing magenta hue counterclockwise towards blue and cyan)

Hm is set equal to –Hm, and $F_1(\text{magenta-hue})=[((1-Hm)*M_{in})+(Hm*C_{in})]$, $F_2(\text{magenta-hue})=[((1-Hm)*C_{in})+(Hm*M_{in})]$, $F_3(\text{magenta-hue})=[Y_{in}]$, for forming:

$B_{out}=F_1(\text{magenta-hue})-F_2(\text{magenta-hue})+F_3(\text{magenta-hue})$, $R_{out}=F_1(\text{magenta-hue})+F_2(\text{magenta-hue})-F_3(\text{magenta-hue})$, and $G_{out}=-F_1(\text{magenta-hue})+F_2(\text{magenta-hue})+F_3(\text{magenta-hue})$, where all the necessary input data and information are known for determining all of the corresponding output image pixel values for each output image pixel.

Changing magenta hue of the real time digital video input image, I, whereby Hm>0, corresponds to changing magenta color, M, of the plurality of input image pixels, I[i,j: $R_{in}$, $G_{in}$, $B_{in}$], clockwise towards red and yellow colors in the RGB color space featuring the color based three-dimensional coordinate system, for forming the real time digital video output image, O, featuring the corresponding plurality of digital output image pixels, O[s,t: $R_{out}$, $G_{out}$, $B_{out}$], having magenta as the individual color whose hue was selected to be independently increased. Changing magenta hue of the real time digital video input image, I, whereby Hm<0, corresponds to changing magenta color, M, of the plurality of input image pixels, I[i,j: $R_{in}$, $G_{in}$, $B_{in}$], counterclockwise towards blue and cyan colors in the RGB color space featuring the color based three-dimensional coordinate system, for forming the real time digital video output image, O, featuring the corresponding plurality of digital output image pixels, O[s,t: $R_{out}$, $G_{out}$, $B_{out}$], having magenta as the individual color whose hue was selected to be independently decreased.

In scenario (B), there is determining corresponding output image pixel values, $R_{out}$, $G_{out}$, $B_{out}$, for each of the plurality of input image pixels, I[i,j: $R_{in}$, $G_{in}$, $B_{in}$], identified as having the individual color in the real time digital video input image whose saturation was selected to be independently changed, by increasing or decreasing, according to the non-zero independent color saturation control delta value, Sclr, previously selected in Step (b), above.

First, in scenario (B), for independently controlling saturation only of an individual color, there is described a third generalized algorithm, featuring evaluating independent color saturation control functions, $F_s$(color-saturation), applicable to the three particular cases corresponding to permutations, that is, RGB, GBR, and, BRG, of the three individual basic colors or color components, red, green, and, blue, associated with the input image pixel values, $R_{in}$, $G_{in}$, and, $B_{in}$, respectively, of input image pixels, I[i,j: $R_{in}$, $G_{in}$, $B_{in}$], of the real time digital video input image, I, characterized by RGB color space, and using the corresponding selected independent color saturation control delta value, Sclr, for forming a corresponding plurality of output image pixels, O[s,t: $R_{out}$, $G_{out}$, $B_{out}$], having the individual color whose saturation was selected to be independently changed.

For Sclr>0(increasing color saturation)

$F_1(\text{color-saturation})=Vclr1_{in}+[Sclr*(D_{RM}-Vclr1_{in})]$, $F_2(\text{color-saturation})=Vclr2_{in}-0.5*[Sclr*(D_{RM}-Vclr1_{in})]$, or, alternatively, $F_2(\text{color-saturation})=Vclr2_{in}$, and $F_3(\text{color-saturation})=Vclr3_{in}-0.5*[Sclr*(D_{RM}-Vclr1_{in})]$, or, alternatively, $F_3(\text{color-saturation})=Vclr3_{in}$;

For Sclr<0(decreasing color saturation)

$F_1(\text{color-saturation})=Vclr1_{in}+[Sclr*(\text{minimum}[|Vclr1_{in}-Vclr2_{in}|, |Vclr1_{in}-Vclr3_{in}|])]$, $F_2(\text{color-saturation})=Vclr2_{in}$, and $F_3(\text{color-saturation})=Vclr3_{in}$;

for forming:

$Vclr1_{out}=F_1(\text{color-saturation})$, $Vclr2_{out}=F_2(\text{color-saturation})$, and $Vclr3_{out}=F_3(\text{color-saturation})$, where Sclr corresponds to the independent color saturation control delta value previously defined and selected in Step (b), above, specifically, of the current selected individual color, clr, and, in particular, of the current selected individual color red, green, or, blue; the $F_s$(color-saturation), for s=1 to 3, are independent color saturation control functions; $D_{RM}$, is a color saturation control parameter, preferably, proportional to the maximum value of the dynamic range of the color level of the real time digital video input image; $Vclr1_{in}$, $Vclr2_{in}$, and $Vclr3_{in}$, are input image pixel values of the three individual basic colors, clr1, clr2, and clr3, respectively, and, in particular, are used for permuting $R_{in}$, $G_{in}$, and $B_{in}$, of input image pixels, I[i,j: $R_{in}$, $G_{in}$, $B_{in}$], of the real time digital video input image, I, characterized by RGB color space; $Vclr1_{out}$, $Vclr2_{out}$, and $Vclr3_{out}$, are corresponding output image pixel values of the three individual basic colors, clr1, clr2, and clr3, respectively, and, in particular, are used for similarly permuting $R_{out}$, $G_{out}$, and $B_{out}$, of output image pixels, O[s,t: $R_{out}$, $G_{out}$, $B_{out}$], of the real time digital video output image, O, characterized by RGB color space, and, as previously stated above, the asterisk symbol, *, represents the mathematical operation of multiplication, and, the double bars symbol, | |, represents the mathematical operation of absolute value of the value indicated inside the double bars.

As indicated above, $D_{RM}$ is a color saturation control parameter, preferably, proportional to the maximum value of the dynamic range of the color level of the real time digital video input image. In particular, $D_{RM}$ is proportional to the maximum value of the dynamic range of pixel values between the black level and the white level of the real time digital video input image, and is a function of the number of bits (for example, 6, 8, or 10 bits) per pixel of a given individual color or color component of the real time digital video input image. For example, preferably, for implementing the method of the present invention, the dynamic range is in terms of 8 bits per pixel, which results in a value of the dynamic range, −128 to +127. Adding an offset control, for example, an offset control equal to +128, to the dynamic range, results in an adjusted dynamic range of 0 to 255, with the maximum value of 255, which, in the method of the present invention, is preferably used as the value of the color saturation control parameter, $D_{RM}$. Accordingly, for the dynamic range of the color level of the real time digital video input image expressed in terms of 9 bits, 10 bits, or, 11 bits, the color saturation control parameter, $D_{RM}$, is assigned the value of 511, 1023, or, 2023, respectively.

In case 1 of scenario (B), where the independent red saturation control delta value, Sr, of Step (b), is not equal to zero, there is determining corresponding output image pixel values, $R_{out}$, $G_{out}$, $B_{out}$, for each of the plurality of input image pixels, I[i,j: $R_{in}$, $G_{in}$, $B_{in}$], identified as having red as the individual color in the real time digital video input image whose saturation was selected to be independently changed, by separately evaluating independent red saturation control functions, $F_s$(red-saturation), using the input image pixel values, $R_{in}$, $G_{in}$, $B_{in}$, of the plurality of input image pixels, I[i,j: $R_{in}$, $G_{in}$, $B_{in}$], identified as having red as the individual color in the real time digital video input image whose saturation was selected to be independently changed, for forming a set of output image pixels, O[s,t: $R_{out}$, $G_{out}$, $B_{out}$], having red as the individual color whose saturation was selected to be independently changed. In case 1, the previously described third generalized algorithm, above, is applied, where the colors, clr1, clr2, clr3, correspond to the particular color permutation of R, G, B, respectively, as follows:

For Sr>0(increasing red saturation)
  $F_1$(red-saturation)=$R_{in}$+[Sr*($D_{RM}$−$R_{in}$)],
  $F_2$(red-saturation)=$G_{in}$−0.5*[Sr*($D_{RM}$−$R_{in}$)], or, alternatively,
  $F_2$(red-saturation)=$G_{in}$, and
  $F_3$(red-saturation)=$B_{in}$−0.5*[Sr*($D_{RM}$−$R_{in}$)], or, alternatively,
  $F_3$(red-saturation)=$B_{in}$;
For Sr<0(decreasing red saturation)
  $F_1$(red-saturation)=$R_{in}$+[Sr*(minimum[|$R_{in}$−$G_{in}$|, |$R_{in}$−$B_{in}$|])],
  $F_2$(red-saturation)=$G_{in}$, and
  $F_3$(red-saturation)=$B_{in}$;
for forming:
  $R_{out}$=$F_1$(red-saturation),
  $G_{out}$=$F_2$(red-saturation), and
  $B_{out}$=$F_3$(red-saturation),
where all the necessary input data and information are known for determining all of the corresponding output image pixel values for each output image pixel.

In case 2 of scenario (B), where the independent green saturation control delta value, Sg, of Step (b), is not equal to zero, there is determining corresponding output image pixel values, $R_{out}$, $G_{out}$, $B_{out}$, for each of the plurality of input image pixels, I[i,j: $R_{in}$, $G_{in}$, $B_{in}$], identified as having green as the individual color in the real time digital video input image whose saturation was selected to be independently changed, by separately evaluating independent green saturation control functions, $F_s$(green-saturation), using the input image pixel values, $R_{in}$, $G_{in}$, $B_{in}$, of the plurality of input image pixels, I[i,j: $R_{in}$, $G_{in}$, $B_{in}$], identified as having green as the individual color in the real time digital video input image whose saturation was selected to be independently changed, for forming a set of output image pixels, O[s,t: $R_{out}$, $G_{out}$, $B_{out}$], having green as the individual color whose saturation was selected to be independently changed. In case 2, the previously described third generalized algorithm, above, is applied, where the colors, clr1, clr2, clr3, correspond to the particular color permutation of G, B, R, respectively, as follows:

For Sg>0(increasing green saturation)
  $F_1$(green-saturation)=$G_{in}$+[Sg*($D_{RM}$−$G_{in}$)],
  $F_2$(green-saturation)=$B_{in}$−0.5*[Sg*($D_{RM}$−$G_{in}$)], or, alternatively,
  $F_2$(green-saturation)=$B_{in}$, and
  $F_3$(green-saturation)=$R_{in}$−0.5*[Sg*($D_{RM}$−$G_{in}$)], or, alternatively,
  $F_3$(green-saturation)=$R_{in}$;
For Sg<0(decreasing green saturaton)
  $F_1$(green-saturation)=$G_{in}$+[Sg*(minimum[|$G_{in}$−$B_{in}$|, |$G_{in}$−$R_{in}$|])],
  $F_2$(green-saturation)=$B_{in}$, and
  $F_3$(green-saturation)=$R_{in}$;
for forming:
  $G_{out}$=$F_1$(green-saturation),
  $B_{out}$=$F_2$(green-saturation), and
  $R_{out}$=$F_3$(green-saturation),
where all the necessary input data and information are known for determining all of the corresponding output image pixel values for each output image pixel.

In case 3 of scenario (B), where the independent blue saturation control delta value, Sb, of Step (b), is not equal to zero, there is determining corresponding output image pixel values, $R_{out}$, $G_{out}$, $B_{out}$, for each of the plurality of input image pixels, I[i,j: $R_{in}$, $G_{in}$, $B_{in}$], identified as having blue as the individual color in the real time digital video input image whose saturation was selected to be independently changed, by separately evaluating independent blue saturation control functions, $F_s$(blue-saturation), using the input image pixel values, $R_{in}$, $G_{in}$, $B_{in}$, of the plurality of input image pixels, I[i,j: $R_{in}$, $G_{in}$, $B_{in}$], identified as having blue as the individual color in the real time digital video input image whose saturation was selected to be independently changed, for forming a set of output image pixels, O[s,t: $R_{out}$, $G_{out}$, $B_{out}$], having blue as the individual color whose saturation was selected to be independently changed. In case 3, the previously described third generalized algorithm, above, is applied, where the colors, clr1, clr2, clr3, correspond to the particular color permutation of B, R, G, respectively, as follows:

For Sb>0(increasing blue saturation)
  $F_1$(blue-saturation)=$B_{in}$+[Sb*($D_{RM}$−$B_{in}$)],
  $F_2$(blue-saturation)=$R_{in}$−0.5*[Sb*($D_{RM}$−$B_{in}$)], or, alternatively,
  $F_2$(blue-saturation)=$R_{in}$, and
  $F_3$(blue-saturation)=$G_{in}$−0.5*[Sb*($D_{RM}$−$B_{in}$)], or, alternatively,
  $F_3$(blue-saturation)=$G_{in}$;
For Sb<0(decreasing blue saturation)
  $F_1$(blue-saturation)=$B_{in}$+[Sb*(minimum[|$B_{in}$−$R_{in}$|, |$B_{in}$−$G_{in}$|])], $F_2$(blue-saturation)=$R_{in}$, and $F_3$(blue-saturation)=$G_{in}$;

for forming:

$B_{out}$=$F_1$(blue-saturation), $R_{out}$=$F_2$(blue-saturation), and $G_{out}$=$F_3$(blue-saturation), where all the necessary input data and information are known for determining all of the corresponding output image pixel values for each output image pixel.

Second, in scenario (B), for independently controlling saturation only of an individual color, there is described a fourth generalized algorithm, featuring evaluating independent color saturation control functions, $F_s$(color-saturation), applicable to the remaining three particular cases corresponding to permutations, that is, YCM, CMY, and, MYC, of the three individual complementary colors or color components, yellow, cyan, and, magenta, expressed in terms of linear combinations of the individual basic colors or color components red, green, and blue, associated with the input image pixel values, $R_{in}$, $G_{in}$, and, $B_{in}$, of input image pixels, I[i,j: $R_{in}$, $G_{in}$, $B_{in}$], of the real time digital video input image, I, characterized by RGB color space, for forming a corresponding plurality of output image pixels, O[s,t: $R_{out}$, $G_{out}$, $B_{out}$], having the individual color whose saturation was selected to be independently changed.

For Sclr>0(increasing color saturation)

$F_1$(color-saturation)=Vclr1$_{in}$+0.5*[Sclr*($D_{RM}$-maximum[Vclr1$_{in}$, Vclr2$_{in}$])], $F_2$(color-saturation)=Vclr2$_{in}$+0.5*[Sclr*($D_{RM}$-maximum[Vclr1$_{in}$, Vclr2$_{in}$])], and $F_3$(color-saturation)=Vclr3$_{in}$−[Sclr*($D_{RM}$-maximum[Vclr1$_{in}$, Vclr2$_{in}$])], or, alternatively, $F_3$(color-saturation)=Vclr3$_{in}$;

For Sclr<0(decreasing color saturation)

$F_1$(color-saturation)=Vclr1$_{in}$[Sclr*(minimum[|Vclr1$_{in}$−Vclr3$_{in}$|, |Vclr2$_{in}$−Vclr3$_{in}$|])], $F_2$(color-saturation)=Vclr2$_{in}$+[Sclr*(minimum[|Vclr1$_{in}$−Vclr3$_{in}$|, |Vclr2$_{in}$−Vclr3$_{in}$|])], and $F_3$(color-saturation)=Vclr3$_{in}$;

for forming:

Vclr1$_{out}$=$F_1$(color-saturation),

Vclr2$_{out}$=$F_2$(color-saturation), and

Vclr3$_{out}$=$F_3$(color-saturation), where Sclr corresponds to the independent color saturation control delta value previously defined and selected in Step (b), above, specifically, of the current selected individual color, clr, and, in particular, of the current selected individual color yellow, cyan, or, magenta; the $F_s$(color-saturation), for s=1 to 3, are independent color saturation control functions; $D_{RM}$, is the previously defined color saturation control parameter; Vclr1$_{in}$, Vclr2$_{in}$ and Vclr3$_{in}$, are input image pixel values of the three individual basic colors, clr1, clr2, and clr3, respectively, and, in particular, are used for permuting $R_{in}$, $G_{in}$, and $B_{in}$, of input image pixels, I[i,j: $R_{in}$, $G_{in}$, $B_{in}$], of the real time digital video input image, I, characterized by RGB color space; and, Vclr1$_{out}$, Vclr2$_{out}$, and Vclr3$_{out}$, are corresponding output image pixel values of the three individual basic colors, clr1, clr2, and clr3, respectively, and, in particular, are used for similarly permuting $R_{out}$, $G_{out}$, and $B_{out}$, of output image pixels, O[s,t: $R_{out}$, $G_{out}$, $B_{out}$], of the real time digital video output image, O, characterized by RGB color space.

In case 4 of scenario (B), where the independent yellow saturation control delta value, Sy, of Step (b), is not equal to zero, there is determining corresponding output image pixel values, $R_{out}$, $G_{out}$, $B_{out}$, for each of the plurality of input image pixels, I[i,j: $R_{in}$, $G_{in}$, $B_{in}$], identified as having yellow as the individual color in the real time digital video input image whose saturation was selected to be independently changed, by separately evaluating independent red saturation control functions, $F_s$(yellow-saturation), using the input image pixel values, $R_{in}$, $G_{in}$, $B_{in}$, of the plurality of input image pixels, I[i,j: $R_{in}$, $G_{in}$, $B_{in}$], identified as having yellow as the individual color in the real time digital video input image whose saturation was selected to be independently changed, for forming a set of output image pixels, O[s,t: $R_{out}$, $G_{out}$, $B_{out}$], having yellow as the individual color whose saturation was selected to be independently changed. In case 4, the previously described fourth generalized algorithm, above, is applied, where the colors, clr1, clr2, clr3, correspond to the particular color permutation of R, G, B, respectively, as follows:

For Sy>0(increasing yellow saturation)

$F_1$(yellow-saturation)=$R_{in}$+0.5*[Sy*($D_{RM}$-maximum[$R_{in}$, $G_{in}$])], $F_2$(yellow-saturation)=$G_{in}$+0.5*[Sy*($D_{RM}$-maximum[$R_{in}$, $G_{in}$])], and $F_3$(yellow-saturation)=$B_{in}$−[Sy*($D_{RM}$-maximum[$R_{in}$, $G_{in}$])], or, alternatively, $F_3$(yellow-saturation)=$B_{in}$;

For Sy<0(decreasing yellow saturation)

$F_1$(yellow-saturation)=$R_{in}$+[Sy*(minimum[|$R_{in}$−$B_{in}$|, |$G_{in}$−$B_{in}$|])], $F_2$(yellow-saturation)=$G_{in}$+[Sy*(minimum[|$R_{in}$−$B_{in}$|, |$G_{in}$−$B_{in}$|])], and $F_3$(yellow-saturation)=$B_{in}$;

for forming:

$R_{out}$=$F_1$(yellow-saturation), $G_{out}$=$F_2$(yellow-saturation), and $B_{out}$=$F_3$(yellow-saturation), where all the necessary input data and information are known for determining all of the corresponding output image pixel values for each output image pixel.

In case 5 of scenario (B), where the independent cyan saturation control delta value, Sc, of Step (b), is not equal to zero, there is determining corresponding output image pixel values, $R_{out}$, $G_{out}$, $B_{out}$, for each of the plurality of input image pixels, I[i,j: $R_{in}$, $G_{in}$, $B_{in}$], identified as having cyan as the individual color in the real time digital video input image whose saturation was selected to be independently changed, by separately evaluating independent green saturation control functions, $F_s$(cyan-saturation), using the input image pixel values, $R_{in}$, $G_{in}$, $B_{in}$, of the plurality of input image pixels, I[i,j: $R_{in}$, $G_{in}$, $B_{in}$], identified as having cyan as the individual color in the real time digital video input image whose saturation was selected to be independently changed, for forming a set of output image pixels, O[s,t: $R_{out}$, $G_{out}$, $B_{out}$], having cyan as the individual color whose saturation was selected to be independently changed. In case 5, the previously described fourth generalized algorithm, above, is applied, where the colors, clr1, clr2, clr3, correspond to the particular color permutation of G, B, R, respectively, as follows:

For Sc>0(increasing cyan saturation)

$F_1$(cyan-saturation)=$G_{in}$+0.5*[Sc*($D_{RM}$-maximum[$G_{in}$, $B_{in}$])], $F_2$(cyan-saturation)=$B_{in}$+0.5*[Sc*($D_{RM}$-maximum[$G_{in}$, $B_{in}$])], and $F_3$(cyan-saturation)=$R_{in}$−[Sc*($D_{RM}$-maximum[$G_{in}$, $B_{in}$])], or, alternatively, $F_3$(cyan-saturation)=$R_{in}$;
For Sc<0(decreasing cyan saturation)
$F_1$(cyan-saturation)=$G_{in}$+[Sc*(minimum[|$G_{in}$-$R_{in}$|, |$B_{in}$-$R_{in}$|])],
$F_2$(cyan-saturation)=$B_{in}$+[Sc*(minimum[|$G_{in}$-$R_{in}$|, |$B_{in}$-$R_{in}$|])], and
$F_3$(cyan-saturation)=$R_{in}$;
for forming:
$G_{out}$=$F_1$(cyan-saturation),
$B_{out}$=$F_2$(cyan-saturation), and
$R_{out}$=$F_3$(cyan-saturation),
where all the necessary input data and information are known for determining all of the corresponding output image pixel values for each output image pixel.

In case 6 of scenario (B), where the independent magenta saturation control delta value, Sm, of Step (b), is not equal to zero, there is determining corresponding output image pixel values, $R_{out}$, $G_{out}$, $B_{out}$, for each of the plurality of input image pixels, I[i,j]: $R_{in}$, $G_{in}$, $B_{in}$], identified as having magenta as the individual color in the real time digital video input image whose saturation was selected to be independently changed, by separately evaluating independent magenta saturation control functions, $F_s$(magenta-saturation), using the input image pixel values, $R_{in}$, $G_{in}$, $B_{in}$, of the plurality of input image pixels, I[i,j]: $R_{in}$, $G_{in}$, $B_{in}$], identified as having magenta as the individual color in the real time digital video input image whose saturation was selected to be independently changed, for forming a set of output image pixels, O[s,t: $R_{out}$, $G_{out}$, $B_{out}$], having magenta as the individual color whose saturation was selected to be independently changed. In case 6, the previously described fourth generalized algorithm, above, is applied, where the colors, clr1, clr2, clr3, correspond to the particular color permutation of B, R, G, respectively, as follows:

For Sm>0(increasing magenta saturation)
$F_1$(magenta-saturation)=$B_{in}$+0.5*[Sm*($D_{RM}$-maximum[$B_{in}$, $R_{in}$])],
$F_2$(magenta-saturation)=$R_{in}$+0.5*[Sm*($D_{RM}$-maximum[$B_{in}$, $R_{in}$])], and
$F_3$(magenta-saturation)=$G_{in}$-[Sm*($D_{RM}$-maximum[$B_{in}$, $R_{in}$])], or, alternatively,
$F_3$(magenta-saturation)=$G_{in}$;
For Sm<0(decreasing magenta saturation)
$F_1$(magenta-saturation)=$B_{in}$+[Sm*(minimum[|$B_{in}$-$G_{in}$|, |$R_{in}$-$G_{in}$|])],
$F_2$(magneta-saturation)=$R_{in}$+[Sm*(minimum[|$B_{in}$-$G_{in}$|, |$R_{in}$-$G_{in}$|])], and
$F_3$(magenta-saturation)=$G_{in}$;
for forming:
$B_{out}$=$F_1$(magenta-saturation),
$R_{out}$=$F_2$(magenta-saturation), and
$G_{out}$=$F_3$(magenta-saturation),
where all the necessary input data and information are known for determining all of the corresponding output image pixel values for each output image pixel.

In Step (e), there is displaying a real time digital video output image including the corresponding plurality of output image pixels having the individual color whose hue or saturation was selected to be independently changed in the real time digital video input image, whereby the hue or saturation of the selected individual color in the real time digital video input image has been changed.

More specifically, in Step (e), there is displaying the real time digital video output image, O, including the corresponding plurality of output image pixels, O[s,t: $R_{out}$, $G_{out}$, $B_{out}$], featuring output image pixel values, $R_{out}$, $G_{out}$, $B_{out}$, having the individual color whose hue or saturation was selected to be independently changed in the real time digital video input image, I, determined according to previously described Step (d), whereby the hue or saturation of the selected individual color in the real time digital video input image, I, has been changed, without affecting the hue or saturation of any other color in the same real time digital video input image, I.

For implementation, there is displaying the real time digital video output image, O, by displaying either each output image pixel, O[s,t: $R_{out}$, $G_{out}$, $B_{out}$], one at a time, featuring output image pixel values, $R_{out}$, $G_{out}$, $B_{out}$, or, by displaying the entire plurality of output image pixels, O[s,t: $R_{out}$, $G_{out}$, $B_{out}$], featuring output image pixel values, $R_{out}$, $G_{out}$, $B_{out}$, (for example, after saving the entire plurality of determined output image pixels in a memory), having the individual color whose hue or saturation was selected to be independently changed in the real time digital video input image, I.

As an exemplary system for implementing the just described method of the present invention is described herein. A user or viewer of a real time digital video image display device, such as a television screen, selects to independently change hue, H, or, selects to independently change saturation, S, of an individual color, clr, such as red, green, blue, yellow, cyan, or, magenta, in the real time digital video input image, I, displayed on the real time video image display device, by activating, such as by pushing or turning, an independent color hue control mechanism, or, an independent color saturation control mechanism, such as a button, dial, or graphic user interface (GUI) menu display, configured on a man-machine interaction (MMI) mechanism featured as part of a master control device, such as a built-in master color controller device, or, a wireless remote master color controller device, in operative electronic communication with the real time video image display device.

Alphanumerical data/information written or designed on the buttons, dials, or, graphic user interface (GUI) menu displays, configured on the man-machine interaction (MMI) mechanism, operatively correspond to the above described independent color hue control delta values, Hclr, and, independent color saturation control delta values, Sclr, where the alphanumerical data/information represents ranges of different extents or magnitudes of change in hue or saturation, respectively, of the individual color, clr, selected by the user or viewer.

Within seconds, following the user or viewer pushing or turning, the independent color hue control mechanism, or, the independent color saturation control mechanism, that is, following pushing or turning one of the buttons, dials, or, GUI menu displays, of the master control device, the real time digital video image display device in operative electronic communication with the master control device performs functions and operations according to the above described Steps (c) through (e) of the method of the present invention, whereby the real time video image display device, such as the television screen, displays the real time digital video output image including the individual color whose hue or saturation was selected to be independently changed in the real time digital video input image, whereby the hue or saturation of the selected individual color in the real time digital video input image has been changed, without affecting the hue or saturation of any other color in the same real time digital video input image.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for independently controlling hue or saturation of individual colors in a real time digital video image, comprising the steps of:

(a) receiving and characterizing the real time digital video input image featuring input image pixels;

(b) selecting to independently change the hue or the saturation of an individual color in the real time digital video input image, by selecting an independent color hue control delta value or an independent color saturation control delta value, respectively, wherein said independent color hue control delta value represents an extent of change in the hue of said selected individual color and wherein said independent color saturation control delta value represents an extent of change in the saturation of said selected individual color;

(c) identifying a plurality of said input image pixels having said selected individual color in the real time digital video input image with the hue or the saturation selected to be independently changed, by performing arithmetic and logical operations using input image pixel values of each said input image pixel of the real time digital video input image;

(d) determining corresponding output image pixel values for each of said plurality of said input image pixels identified as having said selected individual color in the real time digital video input image with the hue or the saturation selected to be independently changed, by separately evaluating independent color hue control functions or independent color saturation control functions, respectively, using said input image pixel values of said plurality of said input image pixels, and using corresponding said selected independent color hue control delta value or said corresponding selected independent color saturation control delta value, for forming a corresponding plurality of output image pixels having said selected individual color with the hue or the saturation selected to be independently changed; and (e) displaying a real time digital video output image including said corresponding plurality of said output image pixels having said selected individual color with the hue or the saturation selected to be independently changed in the real time digital video input image, whereby the hue or the saturation of said selected individual color in the real time digital video input image has been changed without affecting the hue or the saturation of any other individual color in the real time digital video input image.

2. The method of claim 1, whereby the real time digital video input image is of a format selected from the group consisting of RGB format, YCrCb format, and, YUV format, whereby the individual colors of one said format can be characterized by the individual colors of a second said format by using appropriate linear transformations between said formats.

3. The method of claim 1, whereby the real time digital video input image features basic colors red, green, and blue, and, complementary colors yellow, cyan, and magenta, in RGB color space, whereby values of said complementary colors are expressed in terms of and evaluated from linear combinations of values of said basic colors.

4. The method of claim 1, whereby the real time digital video input image features basic colors yellow, cyan, and magenta, and, complementary colors red, green, and blue, in YCM color space, whereby values of said complementary colors are expressed in terms of and evaluated from linear combinations of values of said basic colors.

5. The method of claim 1, whereby in step (b), numerical range of said independent color hue control delta value and numerical range of said independent color saturation control delta value corresponds to an arbitrary interval of integers.

6. The method of claim 1, whereby in step (b), numerical range of said independent color hue control delta value is an interval between −1 and +1.

7. The method of claim 1, whereby in step (b), numerical range of said independent color saturation control delta value is an interval between −1 and +1.

8. The method of claim 1, whereby said independent color hue control delta value is completely independent and separate from said independent color saturation control delta value.

9. The method of claim 1, whereby said independent color saturation control delta value is completely independent and separate from said independent color hue control delta value.

10. The method of claim 1, whereby in step (b), said extent of change in the hue of said selected individual color is selected from the group consisting of a clockwise change and a counterclockwise change, of an angle of said selected individual color towards other individual colors characterized in a color space featuring a color based three-dimensional coordinate system.

11. The method of claim 1, whereby in step (b), said extent of change in the saturation of said selected individual color is selected from the group consisting of an increase and a decrease, of intensity of said individual color characterized in a color space featuring a color based three-dimensional coordinate system.

12. The method of claim 1, whereby in step (c) said arithmetic and logical operations are selected from the group consisting of addition, subtraction, multiplication, division, equal to, greater than, less than, absolute value of, and, combinations thereof.

13. The method of claim 1, whereby step (d) is performed following said identifying each said input image pixel, one at a time, of said plurality of said input image pixels, or, is performed following said identifying entire said plurality of said input image pixels, as having said individual color in the digital video input image whose hue or saturation was selected to be independently changed.

14. The method of claim 1, whereby in step (d), for independently controlling the hue of said selected individual color in the real time digital video image, said independent color hue control function is a function of said input image pixel values of said plurality of said input image pixels and of said corresponding selected independent color hue control delta value.

15. The method of claim 1, whereby in step (d), for independently controlling the saturation of said selected individual color in the real time digital video image, said independent color saturation control function is a function of said input image pixel values of said plurality of said input image pixels and of said corresponding selected independent color saturation control delta value.

16. The method of claim 1, whereby step (e) is performed following said determining said output image pixel values for each said input image pixel, one at a time, of said plurality of said input image pixels, or, is performed following said determining said output image pixel values for entire said plurality of said input image pixels, identified as having said individual color in the real time digital video input image whose hue or saturation was selected to be independently changed.

17. A system for independently controlling hue or saturation of individual colors in a real time digital video image, comprising:
   (a) a real time digital video image display device displaying the real time digital video image featuring input image pixels;
   (b) a master control device in operative electronic communication with and controlling said real time digital video image display device; and
   (c) a viewer of said real time digital video image display device operating said master control device for selecting to independently change the hue or the saturation of an individual color in the real time digital video input image, by selecting an independent color hue control delta value or an independent color saturation control delta value featured on said master control device, respectively, wherein said independent color hue control delta value represents an extent of change in the hue of said selected individual color and wherein said independent color saturation control delta value represents an extent of change in the saturation of said selected individual color, whereby said real time digital video image display device in said operative electronic communication with said master control device performs steps including:
      (i) identifying a plurality of said input image pixels having said selected individual color in the real time digital video input image with the hue or the saturation selected to be independently changed, by performing arithmetic and logical operations using input image pixel values of each said input image pixel of the real time digital video input image;
      (ii) determining corresponding output image pixel values for each of said plurality of said input image pixels identified as having said selected individual color in the real time digital video input image with the hue or the saturation selected to be independently changed, by separately evaluating independent color hue control functions or independent color saturation control functions, respectively, using said input image pixel values of said plurality of said input image pixels, and using corresponding said selected independent color hue control delta value or said corresponding selected independent color saturation control delta value, for forming a corresponding plurality of output image pixels having said selected individual color with the hue or the saturation selected to be independently changed; and
      (iii) displaying a real time digital video output image including said corresponding plurality of said output image pixels having said selected individual color with the hue or the saturation selected to be independently changed in the real time digital video input image, whereby the hue or the saturation of said selected individual color in the real time digital video input image has been changed without affecting the hue or the saturation of any other individual color in the real time digital video input image.

18. The system of claim 17, whereby the real time digital video input image is of a format selected from the group consisting of RGB format, YCrCb format, and, YUV format, whereby the individual colors of one said format can be characterized by the individual colors of a second said format by using appropriate linear transformations between said formats.

19. The system of claim 17, whereby the real time digital video input image features basic colors red, green, and blue, and, complementary colors yellow, cyan, and magenta, in RGB color space, whereby values of said complementary colors are expressed in terms of and evaluated from linear combinations of values of said basic colors.

20. The system of claim 17, whereby the real time digital video input image features basic colors yellow, cyan, and magenta, and, complementary colors red, green, and blue, in YCM color space, whereby values of said complementary colors are expressed in terms of and evaluated from linear combinations of values of said basic colors.

21. The system of claim 17, whereby numerical range of said independent color hue control delta value and numerical range of said independent color saturation control delta value corresponds to an arbitrary interval of integers.

22. The system of claim 17, whereby numerical range of said independent color hue control delta value is an interval between −1 and +1.

23. The system of claim 17, whereby numerical range of said independent color saturation control delta value is an interval between −1 and +1.

24. The system of claim 17, whereby said independent color hue control delta value is completely independent and separate from said independent color saturation control delta value.

25. The system of claim 17, whereby said independent color saturation control delta value is completely independent and separate from said independent color hue control delta value.

26. The system of claim 17, whereby said extent of change in the hue of said selected individual color is selected from the group consisting of a clockwise change and a counterclockwise change, of an angle of said selected individual color towards other individual colors characterized in a color space featuring a color based three-dimensional coordinate system.

27. The system of claim 17, whereby said extent of change in the saturation of said selected individual color is selected from the group consisting of an increase and a decrease, of intensity of said individual color characterized in a color space featuring a color based three-dimensional coordinate system.

28. The system of claim 17, whereby in step (i), said arithmetic and logical operations are selected from the group consisting of addition, subtraction, multiplication, division, equal to, greater than, less than, absolute value of, and, combinations thereof.

29. The system of claim 17, whereby step (ii) is performed following said identifying each said input image pixel, one at a time, of said plurality of said input image pixels, or, is performed following said identifying entire said plurality of said input image pixels, as having said individual color in the digital video input image whose hue or saturation was selected to be independently changed.

30. The system of claim 17, whereby in step (ii), for independently controlling the hue of said selected individual color in the real time digital video image, said independent color hue control function is a function of said input image pixel values of said plurality of said input image pixels and of said corresponding selected independent color hue control delta value.

31. The system of claim 17, whereby in step (ii), for independently controlling the saturation of said selected individual color in the real time digital video image, said independent color saturation control function is a function of said input image pixel values of said plurality of said input image pixels and of said corresponding selected independent color saturation control delta value.

32. The system of claim 17, whereby step (iii) is performed following said determining said output image pixel values for each said input image pixel, one at a time, of said plurality of said input image pixels, or, is performed following said determining said output image pixel values for entire said plurality of said input image pixels, identified as having said individual color in the real time digital video input image whose hue or saturation was selected to be independently changed.

\* \* \* \* \*